US005194717A

United States Patent [19]

Cowen et al.

[11] Patent Number: 5,194,717

[45] Date of Patent: Mar. 16, 1993

[54] BRACKET FOR MOUNTING A CRANKCASE HEATER

[75] Inventors: Russell A. Cowen, Brooklyn, Mich.; Herbert G. Siewert, Sylvania, Ohio

[73] Assignee: Tecumseh Products Company, Tecumseh, Mich.

[21] Appl. No.: 905,071

[22] Filed: Jun. 24, 1992

Related U.S. Application Data

[63] Continuation of Ser. No. 599,486, Oct. 18, 1990, abandoned.

[51] Int. Cl.[5] .............................................. B60L 1/02

[52] U.S. Cl. ................................... 219/205; 219/536; 219/505; 219/201; 248/27.3; 248/309.1

[58] Field of Search ............... 219/205, 200, 201, 505, 219/536, 542; 165/80.1, 80.2; 248/309.1, 314, 27.3; 392/459

[56] References Cited

U.S. PATENT DOCUMENTS

| | | | |
|---|---|---|---|
| 1,460,815 | 7/1923 | Hynes . | |
| 2,418,557 | 4/1947 | Reiser | 219/527 |
| 2,606,061 | 8/1952 | Kuhn | 248/314 |
| 2,698,374 | 12/1954 | Carpenter | 219/205 |
| 2,956,215 | 10/1960 | Andrea | 248/27.3 |
| 3,215,873 | 11/1965 | Kruger et al. | 248/27.3 |
| 3,504,875 | 4/1970 | Johnson et al. | 248/27.3 |
| 3,564,199 | 2/1971 | Blaha | 219/505 |
| 3,720,807 | 3/1973 | Ting | 219/441 |
| 3,940,591 | 2/1976 | Ting | 219/544 |
| 3,995,141 | 11/1976 | Vieau et al. | 219/505 |
| 3,996,447 | 12/1976 | Bouffard et al. | 219/505 |
| 4,091,267 | 5/1978 | Grant | 219/544 |
| 4,334,141 | 6/1982 | Roller et al. | 219/505 |
| 4,429,845 | 2/1984 | Stover et al. | 219/536 |
| 4,755,657 | 7/1988 | Crim et al. | 392/459 |
| 5,011,101 | 4/1991 | Buchser | 248/27.3 |

FOREIGN PATENT DOCUMENTS

| | | | |
|---|---|---|---|
| 557246 | 5/1957 | Belgium | 219/536 |
| 54-137140 | 10/1979 | Japan | 392/453 |
| 55-31272 | 3/1980 | Japan | 219/505 |

*Primary Examiner*—Bruce A. Reynolds
*Assistant Examiner*—John A. Jeffery
*Attorney, Agent, or Firm*—Baker & Daniels

[57] ABSTRACT

A compressor crankcase heater bracket and method of assembly is shown in which a bracket fastened to the compressor accommodates a metal spring clip holding the heater. The method of assembly results in a quick and easy assembly process without compromising the integrity of the transfer of heat to the housing. Thermal transfer is further aided by conduction through the clip and bracket.

17 Claims, 1 Drawing Sheet

BRACKET FOR MOUNTING A CRANKCASE HEATER

This is a continuation of application Ser. No. 07/599,486, filed Oct. 18, 1990, now abandoned.

BACKGROUND OF THE INVENTION

The present invention relates to compressor heaters and more particularly, to a bracket design and method of assembly for a compressor crankcase heater.

In closed loop refrigeration systems, a compressor pumps refrigerant through an evaporator and condenser to provide cooling or refrigeration. The refrigerant cycles through the system to return into the compressor to cycle again. When refrigerant enters the compressor, it is desirable to maintain the refrigerant in a gaseous state during its time within the compressor. Since refrigerant is heavier than lubricant, liquid refrigerant could accumulate in the compressor sump, mixing with and diluting the lubricant, thereby reducing the effectiveness of the lubrication.

The refrigerant may, in liquid form, migrate from the condenser into the compressor crankcase oil sump. During start up of the compressor, the sudden reduction in crankcase pressure may cause the refrigerant to boil, thus causing the lubricant to foam with consequent loss of lubrication to other mechanical parts of the compressor.

Even if the refrigerant is in a gaseous state when returning to the compressor, a lower temperature in the compressor could condense the refrigerant, causing the above identified problems. In order to eliminate these problems and maintain the refrigerant in a gaseous state, compressors have been provided with external heaters to maintain an elevated temperature in the compressor crankcase. Thus, any liquid refrigerant in the compressor crankcase will be vaporized.

Prior art heaters have been utilized, both internal and external. Internal heaters have previously been utilized with compressors by installing them in a heater well with a thermal mastic and a snap ring. However, the heater well is a potential leak source and the mastic is a messy production process. External heaters, mounted to the housing of the compressor, have been wrap-around designs attached with spring retention, screw clamps, adhesive strips, bolted, or welded. All of these mounting methods though are either awkward or unreliable over the expected life of the compressor and often do not provide good thermal transfer.

It is therefore a object of the present invention to provide a mounting method for a crankcase heater whereby the heater can be quickly and easily mounted.

It is therefore another object of the present invention to provide better thermal transfer from the heater to the crankcase sump.

It is further an object of the present invention to provide a heater assembly that is simple and easy to assemble.

SUMMARY OF THE INVENTION

The present invention is a heater bracket and method of assembly which overcomes the problems of the prior art by utilizing a metal bracket which is welded to the compressor housing and a metal spring clip which securely holds the heater and resiliently biases the heater towards and against the housing. The bracket and clip, being metal, conduct the heat to the housing.

Also, the heater is in direct contact with the compressor housing without the intermediary of adhesive strips, glue or the like. This allows for maximum heat transfer efficiency from the heater to the housing and therefore the crankcase.

In addition to the above, the present invention is simple to assemble and disassemble should the heater need to be replaced.

The present invention is a crankcase heater assembly for and in combination with a compressor comprising a bracket, a spring clip and a heater. The bracket has an elongated groove with a recess formed therein which receives the spring clip which has a center protrusion which engages the recess formed in the bracket, and resilient locking tabs for retaining the heater.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates a preferred embodiment of the invention, in one form, and such exemplification is not to be construed as limiting the scope of the invention in any manner.

DESCRIPTION OF THE PREFERRED EMBODIMENT

Figure 1:
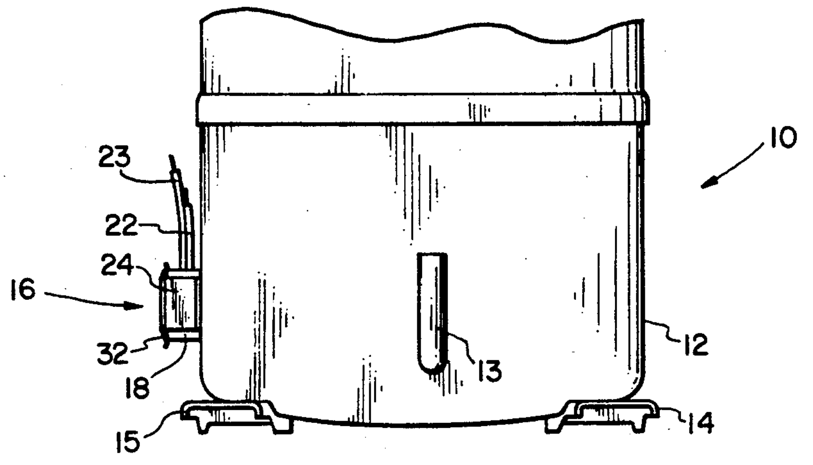
FIG. 1 is a fragmentary elevational view of a compressor having a heater mounted thereto.

Referring to FIG. 1, a compressor 10 is shown having a housing 12, a discharge tube 13, and supports 14 and 15. Attached to compressor housing 12, in a manner to be forthwith described in connection with the method of assembly, is heater assembly 16.

Figure 2:
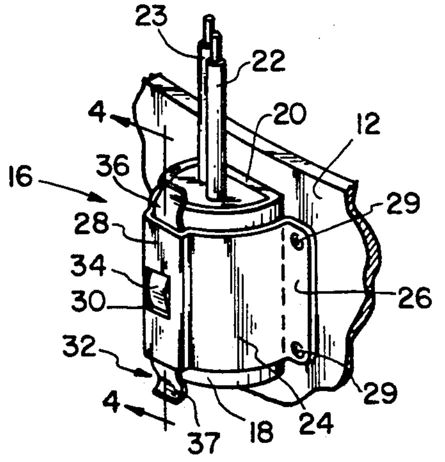
FIG. 2 is an elevational view of the heater and bracket assembly.

Heater assembly 16, shown in more detail in FIG. 2, includes D-shaped PTC heater 18 having a flat or slightly concave side 20 for direct contact with compressor housing 12, and electrical leads 22 and 23 for supplying electrical power. Other types of heaters also may be used. As an alternative embodiment (not shown) the heater may be cylindrically shaped, which mates with and engages a corresponding depression in the compressor housing. A substantially D-shaped metal bracket 24 with outwardly projecting flanges 26 and 27 (shown in FIG. 3) mounted to housing 12 by spot welds 29 forms a channel with housing 12 open on both ends. Bracket 24 has an elongated rectangular groove 28 and a square opening or recessed area 30 for slidably receiving resilient metal clip 32 made of spring steel. Clip 32 may be made from any resilient material, while opening 30 may be of any suitable geometric shape. Metal clip 32, is axially symmetrical from its middle, having a center arcuate protrusion 34 which engages opening 30 in elongated rectangular groove 28 and two reverse "S" end portions or locking tabs 36 and 37. The first arcuate portions 36*a* and 37*a* of reverse "S" locking tabs 36 and 37 extend radially inward, towards housing 12 when assembled, beyond the center axial plane of clip 32 providing a spring locking effect on heater 18. Second arcuate portions 36*a* and 37 extend radially outwardly to provide a camming effect that facilitates insertion of heater 18. Therefore, when assembled with heater 18 received within bracket 24, center arcuate protrusion 34 is captured in opening 30 and resiliently engages bracket 24 while locking tabs 36 and 37 resiliently engage the ends of heater 18 providing secure spring retention of heater 18.

Figure 4:
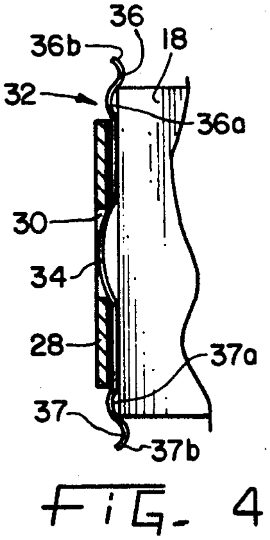
FIG. 4 is a sectional view of the assembly taken along line 4—4 of FIG. 2.

As shown in FIG. 4, when clip 32 is assembled in bracket 24, arcuate protrusion 34 is longer than opening 30 thereby resiliently biasing heater 18 against housing 12 without intermediary materials. This provides excellent thermal conduction from heater 18 to housing 12 thereby heating the oil in the compressor sump. The heat maintains the refrigerant in a gaseous state.

Also, clip 32 and bracket 24 conduct heat from heater 18 to bracket flanges 26 and 27 which transfer heat to the compressor crankcase.

Figure 3:
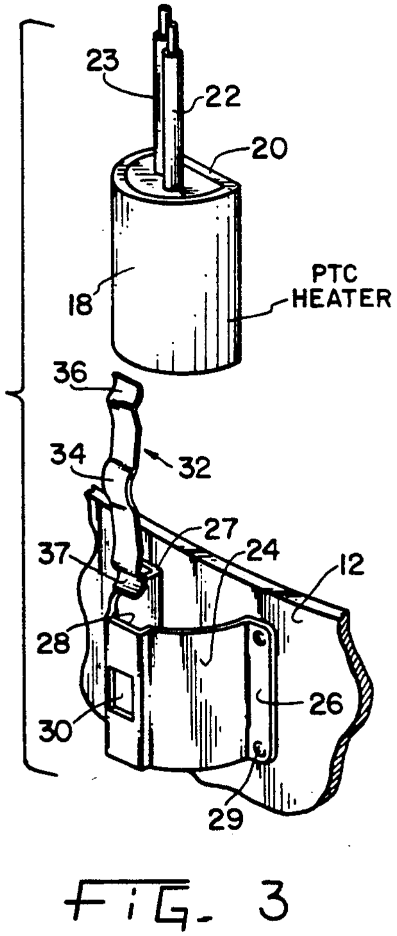
FIG. 3 is an exploded view of the assembly of the heater bracket and clip.

The assembly of the present invention is herewith described with reference to FIG. 3. Bracket 24 is first spot welded to housing 12 according to conventional welding techniques, or fastened in any other suitable manner. Other mounting methods may be utilized, such as rivets, but welding is the preferred method since it is permanent, does not require pre-drilling of holes or otherwise and provides excellent thermal transfer characteristics described above.

Once bracket 24 is secured to housing 12, clip 32 is inserted into bracket 24 until arcuate protrusion 34 engages opening 30 (see FIG. 4). Heater 18 is then inserted leadless end first into bracket 24. Since locking tabs 36 and 37 extend radially inward, heater 18 encounters resistance to sliding engagement into bracket 24. Since, however, clip 32 is also resilient and has arcuate ends 36*b* and 37*b*, a camming action occurs against heater 18 which pushes the tab corresponding to the end in which the heater is being inserted, away from housing 12 while at the same time biasing against heater 18. When heater 18 is fully inserted in bracket 24, both locking tabs 36 and 37 provide a resilient locking action against both ends of bracket 24 such that no movement of heater 18 may occur.

Clip 32, therefore, resiliently holds heater 18 securely against housing 12, providing retained contact of flat side 20 to housing 12 and excellent thermal heat transfer while at the same time conducting heat radiated from the heater to bracket 24 back to housing 12 through flanges 26 and 27.

As an alternate embodiment (not shown) the clip may have only one reverse "S" locking tab and an inwardly projecting flange for supporting the heater. When assembling, the clip would be inserted flange downward, reverse "S" locking tab upward.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. The process of mounting a crankcase heater assembly to the housing of a compressor, comprising the steps of:

fastening a one-piece bracket to the compressor housing, said bracket and said housing forming an enclosed channel open on at least one end;

placing a spring clip, having at least one resilient end portion, through the open end of the enclosed channel formed by said bracket and housing; and while holding said clip in said enclosed channel, sliding a heater through the open end of the enclosed channel in said bracket until held by said resilient end portion of said spring clip.

2. The process of claim 1 wherein two outwardly extending flanges of said bracket are welded to said compressor.

3. The process of claim 1 wherein the placing step includes placing the clip in an elongated rectangular groove of said bracket.

4. In combination with a hermetic compressor having a housing, a crankcase heater assembly comprising:

a bracket having an elongated groove, with a recessed area therein;

a spring clip received in said elongated groove said clip having a center protrusion received in said recessed area and a pair of resilient locking tabs; and a heater slidably received in said bracket and having end portions resiliently retained by said resilient locking tabs.

5. The crankcase heater assembly of claim 4, wherein said bracket is welded to the compressor.

6. The crankcase heater assembly of claim 5, wherein said spring clip is axially symmetrical.

7. The crankcase heater assembly of claim 4, wherein said resilient locking tabs include portions extending away from said compressor.

8. The crankcase heater assembly of claim 4, wherein said resilient locking tabs are arcuate.

9. The crankcase heater assembly of claim 4, wherein said center protrusion is arcuate.

10. In combination with a hermetic compressor having a housing, a crankcase heater assembly comprising:

a one-piece bracket mounted to said housing, said one-piece bracket and said housing forming an enclosed channel open on at least one end;

a spring clip received in said enclosed channel through the open end; and a heater slidably received through the open end of said enclosed channel and retained therein by said spring clip.

11. The crankcase heater assembly of claim 10, wherein said bracket includes at least two flanges connected to said housing.

12. The crankcase heater assembly of claim 10, wherein said bracket is welded to the compressor housing.

13. The crankcase heater assembly of claim 10, wherein said bracket has a groove formed therein for receiving said spring clip.

14. In combination with a hermetic compressor having a housing, a crankcase heater assembly comprising:

a bracket mounted to said housing said bracket including a recessed area;

a spring clip received in said bracket, said spring clip including a center protrusion lockingly received in said recessed area; and a heater slidably received in said bracket and retained in said bracket by said spring clip.

15. The crankcase heater assembly of claim 14, wherein said spring clip further includes a pair of resilient locking tabs that engage said heater.

16. The crankcase heater assembly of claim 15, wherein said locking tabs are inwardly arcuate.

17. The crankcase heater assembly of claim 15 wherein said locking tabs have an inwardly arcuate portion and an outwardly arcuate portion.

* * * * *